(12) United States Patent
Celiesius

(10) Patent No.: US 11,418,504 B1
(45) Date of Patent: Aug. 16, 2022

(54) OPTIMIZED AUTHENTICATION MECHANISM

(71) Applicant: Oversec, UAB, Vilnius (LT)

(72) Inventor: Kazimieras Celiesius, Vilnius (LT)

(73) Assignee: Oversee, UAB, Vilnius (LT)

( * ) Notice: Subject to any disclaimer, the term of this patent is extended or adjusted under 35 U.S.C. 154(b) by 0 days.

(21) Appl. No.: 17/503,346

(22) Filed: Oct. 17, 2021

(51) Int. Cl.
*G06F 21/42* (2013.01)
*G06F 21/72* (2013.01)
*H04L 9/40* (2022.01)
*G06F 21/71* (2013.01)

(52) U.S. Cl.
CPC ...... *H04L 63/0876* (2013.01); *H04L 63/0272* (2013.01); *H04L 63/0823* (2013.01); *H04L 63/102* (2013.01)

(58) Field of Classification Search
None
See application file for complete search history.

(56) References Cited

U.S. PATENT DOCUMENTS

| | | | | |
|---|---|---|---|---|
| 6,789,068 | B1* | 9/2004 | Blaze | G06Q 30/06 705/64 |
| 8,132,242 | B1* | 3/2012 | Wu | H04L 63/0884 726/8 |
| 9,594,911 | B1* | 3/2017 | Khitrenovich | G06F 21/31 |
| 9,608,981 | B2* | 3/2017 | Pal | H04L 63/0272 |
| 10,992,670 | B1* | 4/2021 | Drooger | H04L 12/4641 |
| 11,240,240 | B1* | 2/2022 | Williams | H04L 63/0846 |
| 2008/0232595 | A1* | 9/2008 | Pietrowicz | H04L 9/3297 380/277 |
| 2009/0144817 | A1* | 6/2009 | Kumar | H04L 69/40 726/12 |
| 2009/0313691 | A1* | 12/2009 | Chien | H04L 63/083 726/15 |
| 2011/0041167 | A1* | 2/2011 | Nguyen | H04L 63/062 726/6 |
| 2015/0382193 | A1* | 12/2015 | Johnson | H04L 63/0272 455/411 |
| 2016/0337346 | A1* | 11/2016 | Momchilov | H04L 63/0272 |
| 2017/0034284 | A1* | 2/2017 | Smith | H04L 9/0825 |
| 2017/0237735 | A1* | 8/2017 | Johnson | H04L 63/0884 726/5 |
| 2019/0386961 | A1* | 12/2019 | Kupisiewicz | H04L 12/4641 |
| 2021/0067516 | A1* | 3/2021 | de Neef | H04L 12/2869 |

(Continued)

OTHER PUBLICATIONS

Implementation of Bandwidth Management Authentication. Rahman. IJCANDI. (Year: 2016).*

(Continued)

*Primary Examiner* — Venkat Perungavoor
(74) *Attorney, Agent, or Firm* — The Pattani Law Group

(57) ABSTRACT

A method including receiving, at a processor, credential requests for accessing the VPN environment from a first user device using a first interface and from a second user device using a second interface; transmitting, to the first user device, a first credential based at least in part on the first user device using the first interface; and transmitting, to the second user device, a second credential based at least in part on the second user device using the second interface, the first credential being different from the second credential. Various other aspects are contemplated.

17 Claims, 5 Drawing Sheets

---

400

410 — Receiving, at a processor from a user device, a credential request for accessing the VPN environment

420 — Transmitting, by the processor to the user device, a short-term credential based at least in part on determining that the user device is not associated with an authenticated certificate

430 — Transmitting, by the processor to the user device, information associated with the authenticated certificate to enable the user device to exchange the short-term credential for a long-term credential

440 — Transmitting, by the processor to the user device, the long-term credential based at least in part on determining that the user device is associated with the authenticated certificate

(56) References Cited

U.S. PATENT DOCUMENTS

2021/0144004 A1* 5/2021 Gray .................... H04L 9/3265
2021/0400041 A1* 12/2021 Delcourt ............... H04L 63/123

OTHER PUBLICATIONS

Open source system OpenVPN in a function of Virtual Private Network. Skendzic. IOP Publishing. (Year: 2016).*
Oh-Pwn-VPN! Security Analysis of OpenVPN-Based Android Apps. Zhang. Springer. (Year: 2018).*
Enhancing VPN Security through Security Policy Management. Singh. IEEE. (Year: 2012).*
Inter-Cloud Authentication through X.509 for Defense Organization. Airfeen. IEEE. (Year: 2015).*

* cited by examiner

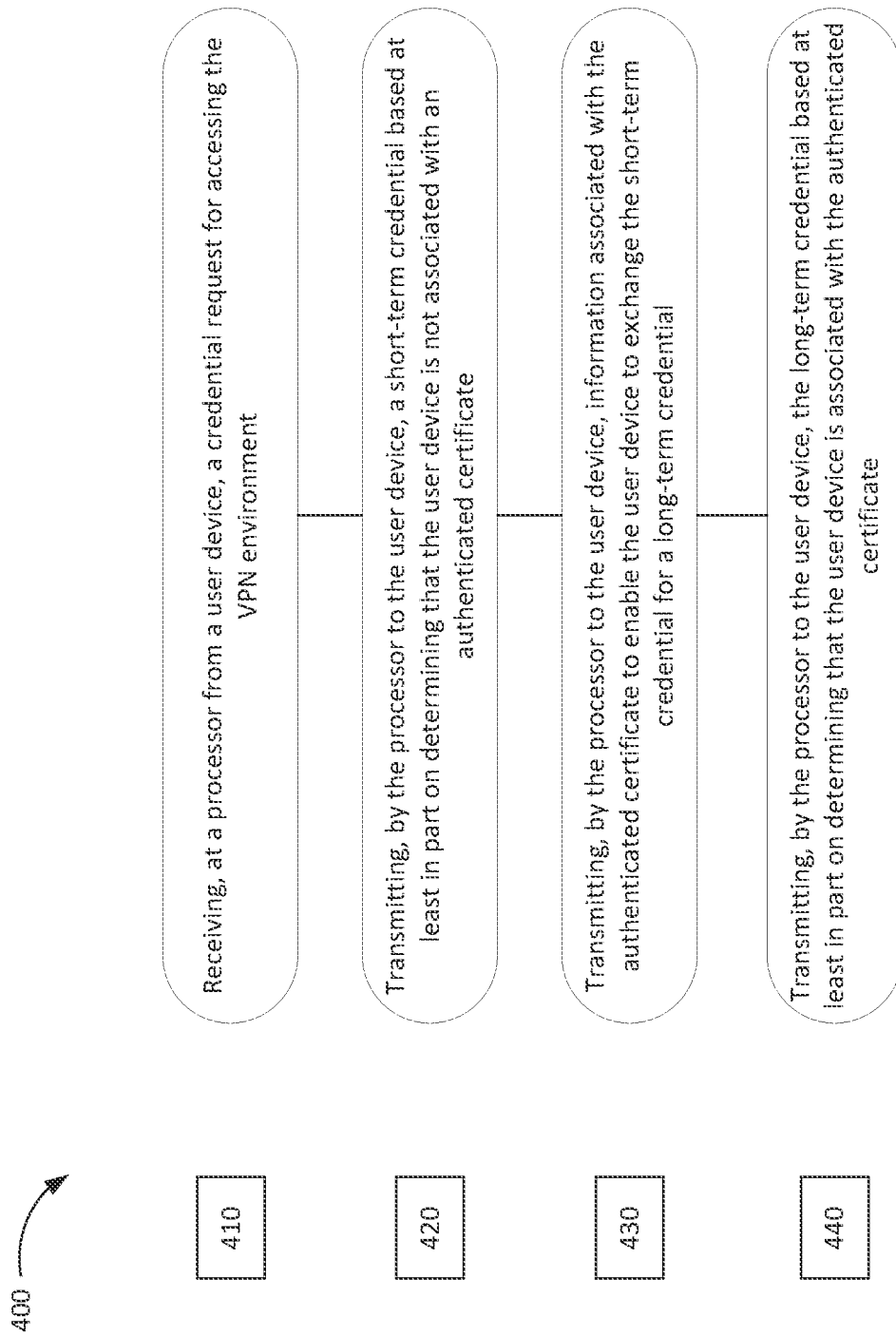

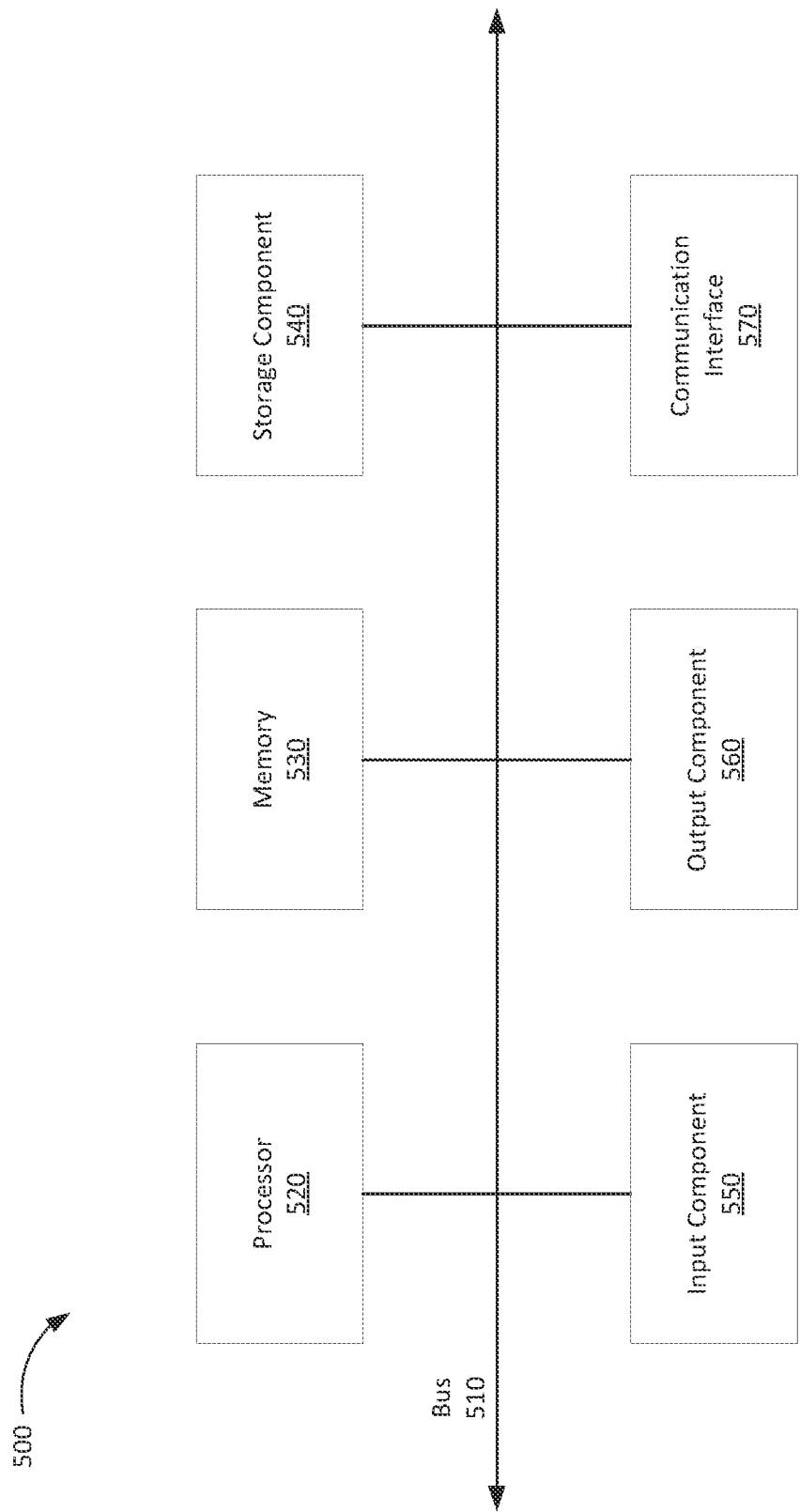

OPTIMIZED AUTHENTICATION MECHANISM

FIELD OF DISCLOSURE

Aspects of the present disclosure generally relate to a virtual private network (VPN), and more particularly to providing an optimized authentication mechanism in a VPN.

BACKGROUND

Global Internet users increasingly rely on VPN services to preserve their privacy, to circumvent censorship, and/or to access geo-filtered content. Originally developed as a technology to privately send and receive data across public networks, VPNs are now used broadly as a privacy-preserving technology that allows Internet users to obscure not only the communicated data but also personal information such as, for example, web browsing history from third parties including Internet service providers (ISPs), Spywares, or the like. A VPN service provider may offer a secure private networking environment within a publicly shared, insecure infrastructure through encapsulation and encryption of the data communicated between a VPN client application (or VPN application) installed on a user device and a remote VPN server.

Most VPN providers rely on a tunneling protocol to create the secure private networking environment, which adds a layer of security to protect each IP packet of the communicated data during communication over the Internet. Tunneling may be associated with enclosing an entire IP packet within an outer IP packet to form an encapsulated IP packet, and transporting the enclosed IP packet over the Internet. The outer IP packet may protect contents of the enclosed IP packet from public view by ensuring that the enclosed IP packet is transmitted over the Internet within a virtual tunnel. Such a virtual tunnel may be a point-to-point tunnel established between the user device and the VPN server. The process of enclosing the entire IP packet within the outer IP packet may be referred to as encapsulation. Computers, servers, or other network devices at ends of the virtual tunnel may be referred to as tunnel interfaces and may be capable of encapsulating outgoing IP packets and of unwrapping incoming encapsulated IP packets.

Encryption may be associated with changing the data from being in a transparently readable format to being in an encoded, unreadable format with the help of an encryption algorithm. Decryption may be associated with changing the data from being in the encoded, unreadable format to being in the transparently readable format with the help of a decryption algorithm. In an example, encoded/encrypted data may be decoded/decrypted with only a correct decryption key. In a VPN, encryption may render the communicated data unreadable or indecipherable to any third party. At a basic level, when the user launches the installed VPN application and connects to the VPN server, the VPN application may encrypt all contents of the data before transmission over the Internet to the VPN server. Upon receipt, the VPN server may decrypt the encrypted data and forward the decrypted data to an intended target via the Internet. Similarly, the VPN server may encrypt all contents of the data before transmission over the Internet to the user device. Upon receipt, the VPN application on the user device may decrypt the encrypted data and provide the decrypted data to the user.

VPNs generally use different types of encryption and decryption algorithms to encrypt and decrypt the communicated data. Symmetric encryption may utilize encryption and decryption algorithms that rely on a single private key for encryption and decryption of data. Symmetric encryption is considered to be relatively speedy. One example of an encryption and decryption algorithm utilized by symmetric encryption may be an AES encryption cipher. Asymmetric encryption, on the other hand, may utilize encryption and decryption algorithms that rely on two separate but mathematically-related keys for encryption and decryption of data. In one example, data encrypted using a public key may be decrypted using a separate but mathematically-related private key. The public key may be publicly available through a directory, while the private key may remain confidential and accessible by only an owner of the private key. Asymmetric encryption may also be referred to as public key cryptography. One example of an encryption and decryption algorithm utilized by asymmetric encryption may be Rivest-Shamir-Adleman (RSA) protocol.

In a VPN, keys for encryption and decryption may be randomly generated strings of bits. Each key may be generated to be unique. A length of an encryption key may be given by a number of the randomly generated string bits, and the longer the length of the encryption key, the stronger the encryption is.

VPNs may employ user authentication, which may involve verification of credentials required to confirm authenticity/identity of the user. For instance, when a user launches the VPN application to request a VPN connection, the VPN service provider may authenticate the user device prior to providing the user device with access to VPN services. In this way, user authentication may provide a form of access control. Typically, user authentication may include verification of a unique combination of a user ID and password. To provide improved security in the VPN, user authentication may include additional factors such as knowledge, possession, inheritance, or the like. Knowledge factors may include items (e.g., pin numbers) that an authentic user may be expected to know. Possession factors may include items (e.g., one-time password (OTP) tokens) that an authentic user may be expected to possess at a time associated with the authentication. Inherent factors may include biometric items (e.g., fingerprint scans, retina scans, iris scans, or the like) that may be inherent traits of an authentic user.

A VPN may be associated with a network of VPN servers, typically deployed in various geographic locations. A VPN server may be a physical server or a virtual server configured to host and/or globally deliver VPN services to the user. A server may be a combination of hardware and software, and may include logical and physical communication ports. When launched, the VPN application may connect with a selected VPN server for secure communication of data via the virtual tunnel.

The VPN application, installed on the user device, may utilize software-based technology to establish a secure connection between the user device and a VPN server. Some VPN applications may automatically work in the background on the user device while other VPN applications may include front-end interfaces to allow the user to interact with and configure the VPN applications. VPN applications may often be installed on a computer (e.g., user device), though some entities may provide a purpose-built VPN application as a hardware device that is pre-installed with software to enable the VPN. Typically, a VPN application may utilize one or more VPN protocols to encrypt and decrypt the communicated data. Some commonly used VPN protocols may include OpenVPN, SSTP, PPTP, L2TP/IPsec, SSL/TLS, Wireguard, IKEv2, and SoftEther.

SUMMARY

In one aspect, the present disclosure contemplates a method in a virtual private network (VPN) service environment, the method including receiving, at a processor, credential requests for accessing the VPN environment from a first user device using a first interface and from a second user device using a second interface; transmitting, to the first user device, a first credential based at least in part on the first user device using the first interface; and transmitting, to the second user device, a second credential based at least in part on the second user device using the second interface, the first credential being different from the second credential.

In another aspect, the present disclosure contemplates a device associated with a VPN, the device comprising a memory and a processor communicatively coupled to the memory, the processor being configured to: receive, at a processor, credential requests for accessing the VPN environment from a first user device using a first interface and from a second user device using a second interface; transmit, to the first user device, a first credential based at least in part on the first user device using the first interface; and transmit, to the second user device, a second credential based at least in part on the second user device using the second interface, the first credential being different from the second credential.

In another aspect, the present disclosure contemplates a non-transitory computer readable medium storing instructions, which when executed by a processor cause the processor to: receive, at a processor, credential requests for accessing the VPN environment from a first user device using a first interface and from a second user device using a second interface; transmit, to the first user device, a first credential based at least in part on the first user device using the first interface; and transmit, to the second user device, a second credential based at least in part on the second user device using the second interface, the first credential being different from the second credential.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
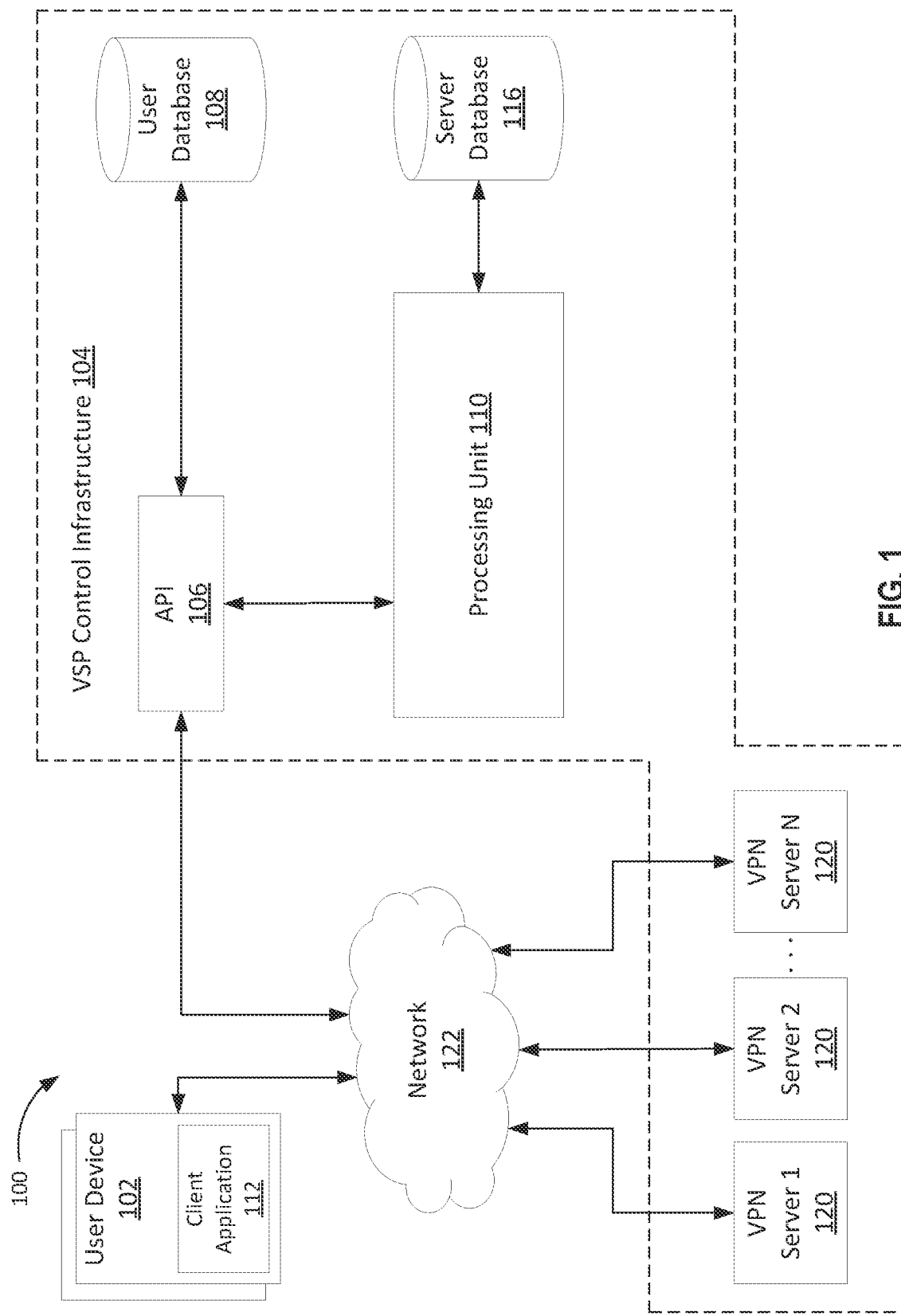

FIG. 1 is an illustration of an example system associated with providing an optimized authentication mechanism in a VPN, according to various aspects of the present disclosure.

Figure 2:
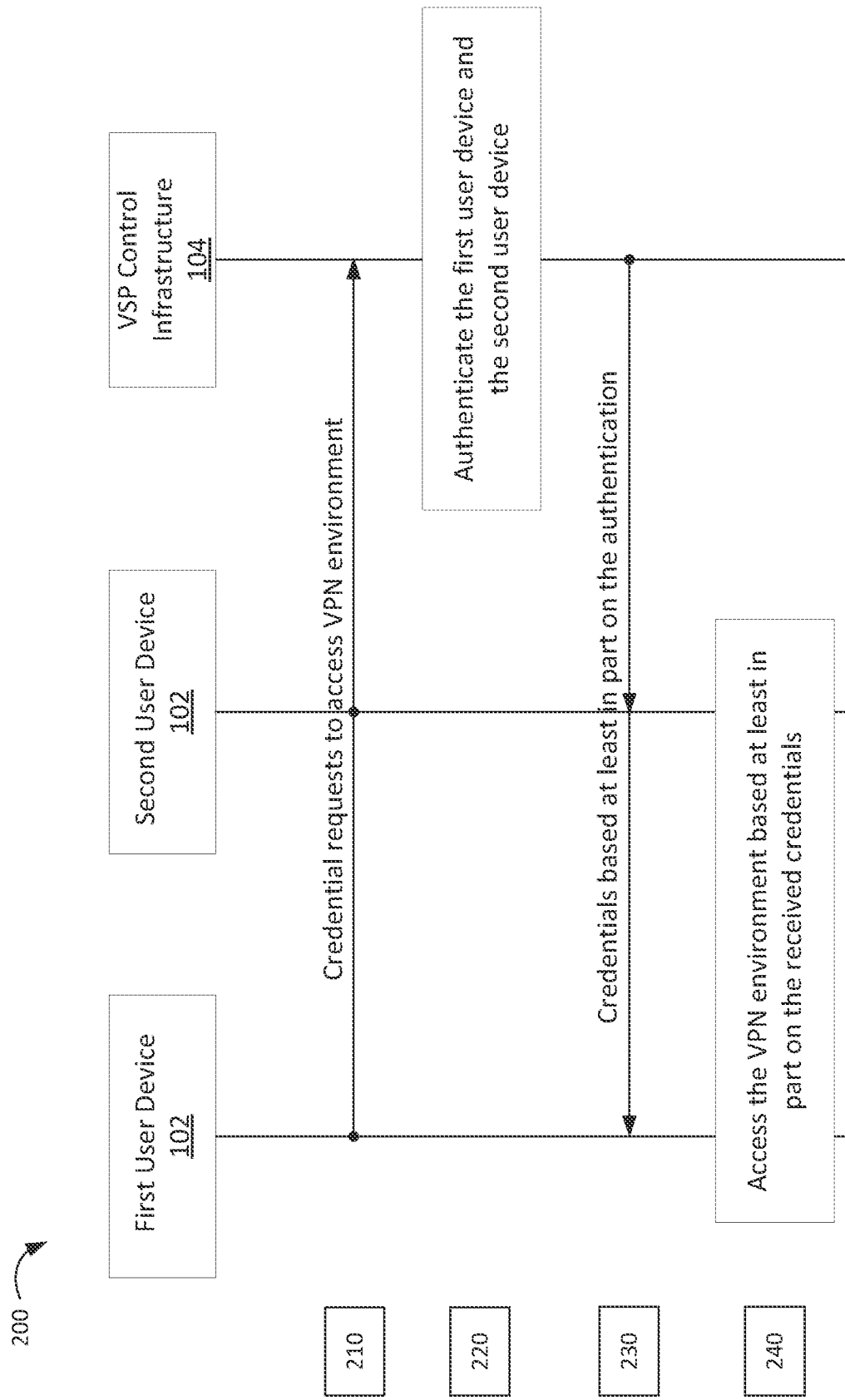

FIG. 2 is an illustration of an example flow associated with providing an optimized authentication mechanism in a VPN, according to various aspects of the present disclosure.

Figure 3:
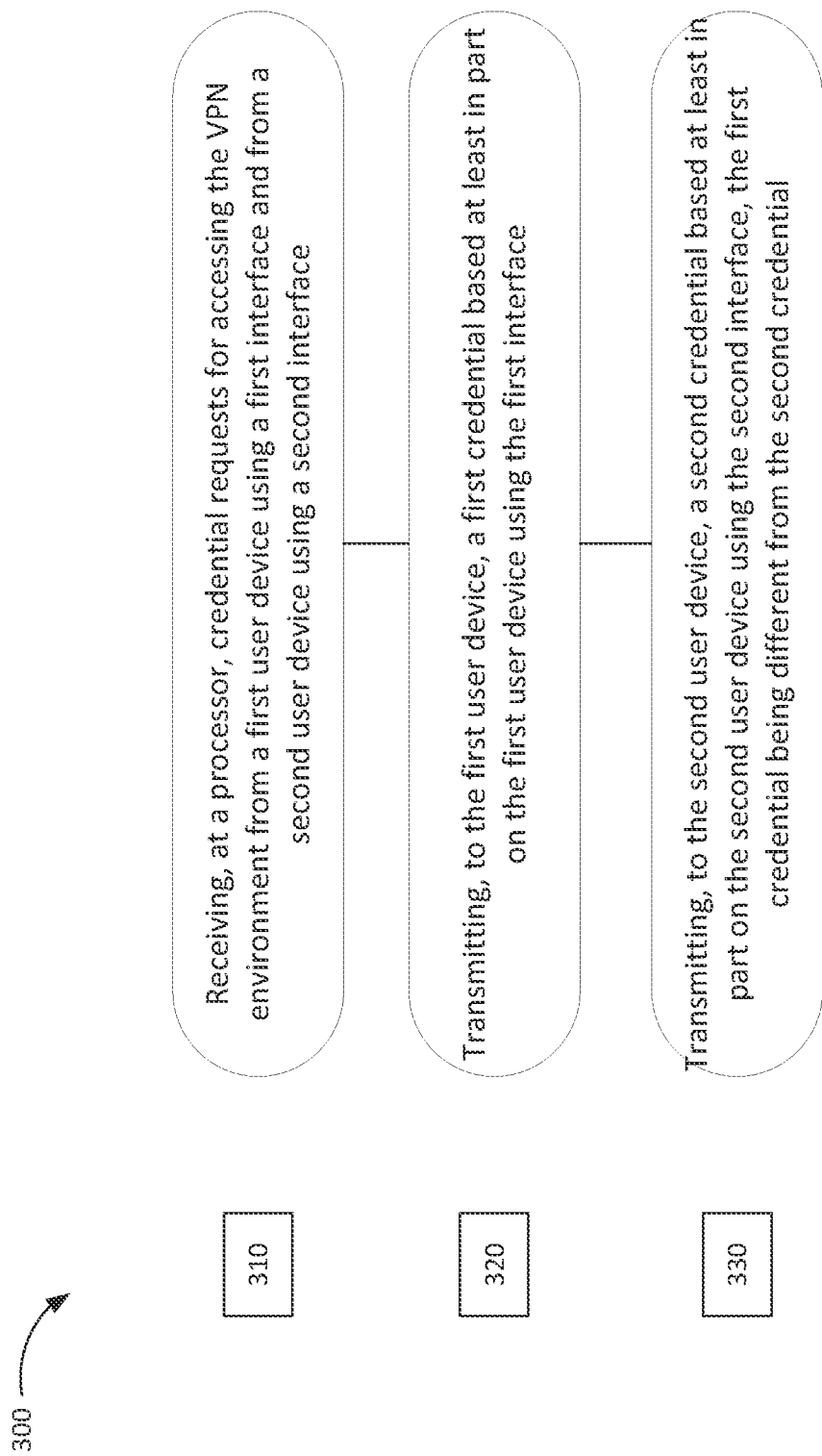

FIG. 3 is an illustration of an example process associated with providing an optimized authentication mechanism in a VPN, according to various aspects of the present disclosure.

FIG. 4 is an illustration of an example process associated with providing an optimized authentication mechanism in a VPN, according to various aspects of the present disclosure.

FIG. 5 is an illustration of example devices associated with providing an optimized authentication mechanism in a VPN, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example system 100 associated with providing an optimized authentication mechanism in a VPN, according to various aspects of the present disclosure. Example 100 shows an architectural depiction of components included in system 100. In some aspects, the components may include a user device 102 capable of communicating with one or more VPN servers 120 and with a VPN service provider (VSP) control infrastructure 104 over a network 122. The VSP control infrastructure 104 may be controlled by a VPN service provider and may include an application programming interface (API) 106, a user database 108, processing unit 110, a server database 116, and the one or more VPN servers 120. As shown in FIG. 1, the API 106 may be capable of communicating with the user database 108 and with the processing unit 110. Additionally, the processing unit 110 may be capable of communicating with the server database, which may be capable of communicating with a testing module (not shown). The testing module may be capable of communicating with the one or more VPN servers 120 over the network 122. The processing unit 110 may be capable of controlling operation of the one or more VPN servers 120.

The user device 102 may be a physical computing device capable of hosting a VPN application and of connecting to the network 122. The user device 102 may be, for example, a laptop, a mobile phone, a tablet computer, a desktop computer, a smart device, a router, or the like. In some aspects, the user device 102 may include, for example, Internet-of-Things (IoT) devices such as VSP smart home appliances, smart home security systems, autonomous vehicles, smart health monitors, smart factory equipment, wireless inventory trackers, biometric cyber security scanners, or the like. The network 122 may be any digital telecommunication network that permits several nodes to share and access resources. In some aspects, the network 122 may include one or more of, for example, a local-area network (LAN), a wide-area network (WAN), a campus-area network (CAN), a metropolitan-area network (MAN), a home-area network (HAN), Internet, Intranet, Extranet, and Internetwork.

The VSP control infrastructure 104 may include a combination of hardware and software components that enable provision of VPN services to the user device 102. The VSP control infrastructure 104 may interface with (the VPN application on) the user device 102 via the API 106, which may include one or more endpoints to a defined request-response message system. In some aspects, the API 106 may be configured to receive, via the network 122, a connection request from the user device 102 to establish a VPN connection with a VPN server 120. The connection request may include an authentication request to authenticate the user device 102 and/or a request for an IP address of an optimal VPN server for establishment of the VPN connection therewith. In some aspects, an optimal VPN server may be a single VPN server 120 or a combination of one or more VPN servers 120. The API 106 may receive the authentication request and the request for an IP address of an optimal VPN server in a single connection request. In some aspects, the API 106 may receive the authentication request and the request for an IP address of an optimal VPN server in separate connection requests.

The API 106 may further be configured to handle the connection request by mediating the authentication request. For instance, the API 106 may receive from the user device 102 credentials including, for example, a unique combination of a user ID and password for purposes of authenticating the user device 102. In another example, the credentials may include a unique validation code known to an authentic user. The API 106 may provide the received credentials to the user database 108 for verification.

The user database 108 may include a structured repository of valid credentials belonging to authentic users. In one example, the structured repository may include one or more tables containing valid unique combinations of user IDs and passwords belonging to authentic users. In another example, the structured repository may include one or more tables containing valid unique validation codes associated with authentic users. The VPN service provider may add or delete such valid unique combinations of user IDs and passwords from the structured repository at any time. Based at least in part on receiving the credentials from the API 106, the user database 108 and a processor (e.g., the processing unit 110 or another local or remote processor) may verify the received credentials by matching the received credentials with the valid credentials stored in the structured repository. In some aspects, the user database 108 and the processor may authenticate the user device 102 when the received credentials match at least one of the valid credentials. In this case, the VPN service provider may provide VPN services to the user device 102. When the received credentials fail to match at least one of the valid credentials, the user database 108 and the processor may fail to authenticate the user device 102. In this case, the VPN service provider may decline to provide VPN services to the user device 102.

When the user device 102 is authenticated, the user device 102 may initiate a VPN connection and may transmit to the API 106 a request for an IP address of an optimal VPN server. The processing unit 110 included in the VSP control infrastructure may be configured to determine/identify a single VPN server 120 as the optimal server or a list of VPN servers. The processing unit 110 may utilize the API 106 to transmit the IP address of the optimal server or IP addresses of the VPN servers 120 included in the list to the user device 102. In the case where the list of IP addresses of the VPN servers 120 is provided, the user device 102 may have an option to select a single VPN server 120 from among the listed VPN servers as the optimal server 120. The user device 102 may transmit an initiation request to establish a VPN connection (e.g., an encrypted tunnel) with the optimal VPN server. In some aspects, the optimal VPN server with which the user device establishes the encrypted tunnel may be referred to as a primary VPN server or an entry VPN server. In some aspects, a VPN server 120 may be a piece of physical or virtual computer hardware and/or software capable of securely communicating with (the VPN application on) the user device 102 for provision of VPN services.

The processing unit 110 may be a logical unit including a scoring engine. The processing unit 110 may include a logical component configured to perform complex operations to compute numerical weights related to various factors associated with the VPN servers 120. The scoring engine may likewise include a logical component configured to perform arithmetical and logical operations to compute a server penalty score for one or more of the VPN servers 120.

In some aspects, based at least in part on server penalty scores calculated via the complex operations and/or the arithmetical and logical operations, the processing unit 110 may determine an optimal VPN server. In one example, the processing unit 110 may determine the VPN server 120 with the lowest server penalty score as the optimal VPN server. In another example, the processing unit 110 may determine the list of optimal VPN servers by including, for example, three (or any other number) VPN servers 120 with the three lowest server penalty scores.

One or more components (e.g., API 106, user database 108, processing unit 110, and/or server database 116) included in the VSP control infrastructure 104 may further be associated with a controller/processor, a memory, a communication interface, or a combination thereof (e.g., FIG. 5). For instance, the one or more components of the set of components may include or may be included in a controller/processor, a memory, or a combination thereof. In some aspects, the one or more of the components included in the VSP control infrastructure 104 may be separate and distinct from each other. Alternatively, in some aspects, one or more of the components included in the VSP control infrastructure 104 may be combined with one or more of other components included in the VSP control infrastructure 104. In some aspects, the one or more of the components included in the VSP control infrastructure 104 may be local with respect to each other. Alternatively, in some aspects, one or more of the components included in the VSP control infrastructure 104 may be located remotely with respect to one or more of other components included in the VSP control infrastructure 104. Additionally, or alternatively, one or more components of the components included in the VSP control infrastructure 104 may be implemented at least in part as software stored in a memory. For example, a component (or a portion of a component) may be implemented as instructions or code stored in a non-transitory computer-readable medium and executable by a controller or a processor to perform the functions or operations of the component. Additionally, or alternatively, a set of (one or more) components shown in FIG. 1 may be configured to perform one or more functions described as being performed by another set of components shown in FIG. 1.

As indicated above, FIG. 1 is provided as an example. Other examples may differ from what is described with regard to FIG. 1.

User devices may request a VSP control infrastructure to provide access to an associated VPN environment. The user devices may use a web interface (e.g., via a website) or a client application (e.g., application interface) to transmit the request. The client application may be associated with and/or provided by the VSP control infrastructure. A user device may be a known user device that has been previously registered with the VSP control infrastructure or may be an unknown user device that has not previously been registered with the VSP control infrastructure. Using the web interface may enable the user device to receive access to perform administrative tasks such as, for example, determine available VPN services and associated costs, edit information (e.g., address, password, etc.) associated with the user device, or the like. Using the application interface may enable the user device to receive access to obtain VPN services including, for example, transmitting data requests and receiving data of interest.

Typically, the VSP control infrastructure may utilize a first API to service a user device using the web interface and a second API to service a user device using the application interface. The first API may conduct a first authentication to enable the user device to receive access to perform administrative tasks and the second API may conduct a second authentication to enable the user device to receive access to obtain VPN services. Maintaining a plurality of APIs and managing a plurality of authentication processes may consume resources associated with the VSP control infrastructure (e.g., management resources, processing resources, consumed power, network bandwidth, storage resources, etc.) that may otherwise be utilized to perform more suitable tasks associated with the VPN.

Alternatively, the VSP control infrastructure may utilize a single API to service a user device using the web interface and a user device using the application interface. In this case, the single API may similarly authenticate the user device using the web interface and the user device using the application interface. As a result, the user device using the web interface may be provided with a similar level of access to VPN services as the user device using the application interface. In such situations, the user device using the web interface may remain connected to the VPN environment for a threshold duration of time, during which private data associated with the user device may become compromised. In an example, private data (e.g., a location of the user device, an identity of an owner of the user device, a list of websites visited by the user device, a nature of data requested by the user device, or the like) communicated via the web interface may be cached and/or traced by third party trackers. In another example, the web interface may allow harmful content (e.g., cookies, malware, etc.) to be stored on the user device, thereby enabling unauthorized access to the user device. Additionally, the harmful content may cause damage to the user device.

Various aspects of systems and techniques discussed in the present disclosure enable providing an optimized authentication mechanism in a VPN. In some aspects, a VSP control infrastructure may configure a single API to service a user device requesting the VSP control infrastructure for access to the VPN using an application interface and a user device requesting the VSP control infrastructure for access to the VPN using a web interface. In some aspects, the VSP control infrastructure may utilize the single API to authenticate the user device using the application interface differently with respect to the user device using the web interface. For instance, the VSP control infrastructure may configure the single API to provide the user device using the application interface with a first level of access and to provide the user device using the web interface with a second level of access. In some aspects, the first level of access may include access for a first duration of time and the second level of access may include access for a second duration of time, the first duration of time being longer than the second duration of time. Further, the first level of access may include access for obtaining VPN services and the second level of access may include access for performing administrative tasks. In this way, by providing the optimized authentication mechanism, the VSP control infrastructure may mitigate having to maintain a plurality of APIs and to manage a plurality of authentication processes, thereby enabling efficient utilization of resources associated with the VSP control infrastructure (e.g., management resources, processing resources, consumed power, network bandwidth, storage resources, etc.) for more suitable tasks associated with the VPN. Further, the VSP control infrastructure may mitigate instances of private data associated with the user device becoming compromised and/or instances of damage to the user device.

In some aspects, a processor (e.g., processing unit 110, processor 620, etc.) associated with the VSP control infrastructure may receive credential requests for accessing the VPN environment from a first user device using a first interface and from a second user device using a second interface, transmit, to the first user device, a first credential based at least in part on the first user device using the first interface, and transmit, to the second user device, a second credential based at least in part on the second user device using the second interface, the first credential being different from the second credential.

FIG. 2 is an illustration of an example flow associated with providing an optimized authentication mechanism in a VPN, according to various aspects of the present disclosure. In the example flow 200, a first user device 102 and a second user device 102 (collectively, "user devices 102") may be in communication with a VSP control infrastructure 104. In some aspects, the user devices 102 and the VSP control infrastructure 104 may communicate over a network (e.g., network 122). In some aspects, the user devices 102 may communicate with the VSP control infrastructure 104 via the single API (e.g., API 106).

As shown by reference numeral 210, the user devices 102 may transmit credential requests to the VSP control infrastructure 104 for purposes of accessing a VPN environment associated with the VSP control infrastructure 104. In some aspects, the user devices 102 may use various interfaces to transmit the credential requests. In an example, the first user device 102 may use a VPN application interface (e.g., first interface) to transmit the credential request. In some aspects, using the VPN application interface may include using a client application 112 provided by, for example, a VSP associated with the VSP control infrastructure 104 and installed on the first user device 102. In another example, the second user device 102 may use a web interface (e.g., second interface) to transmit the credential request. In some aspects, using the web interface may include using a web browser to communicate data utilizing a hypertext transfer protocol (e.g., HTTP, HTTPS, etc.) over the Internet. In some aspects, a single user device 102 (e.g., the first user device 102 or the second user device 102) may use the VPN application interface to transmit a first credential request and may use the web interface to transmit a second credential request. In other words, the VSP control infrastructure 104 may receive a plurality of credential requests using respective interfaces from a single user device 102.

As shown by reference numeral 220, the VSP control infrastructure 104 may perform authentication of the user devices 102. In some aspects, the authentication may include determining whether the interfaces used by the user devices 102 are associated with an authenticated certificate. In some aspects, the VSP control infrastructure 104 may perform the authentication based at least in part on information provided in the credential requests. For instance, the VSP control infrastructure 104 may determine whether the credential requests include information indicating that the user devices 102 are using interfaces associated with authenticated certificates. In an example, with respect to the first user device 102, the VPN application interface may or may not be associated with an authenticated certificate. When the VSP control infrastructure 104 determines that the first user device 102 is using a VPN application interface that is associated with the authenticated certificate, the VSP control infrastructure 104 may authenticate the first user device 102 as a user device that is using an interface that is associated with the authenticated certificate, and may determine that a long-term credential (e.g., first credential) is to be transmitted to the first user device 102. Alternatively, when the VSP control infrastructure 104 determines that the first user device 102 is using a VPN application interface that is not associated with the authenticated certificate, the VSP control infrastructure 104 may authenticate the first user device 102 as a user device that is using an interface that is not associated with the authenticated certificate, and may determine that a short-term credential (e.g., second credential) is to be transmitted to the first user device 102. With respect to the second user device 102, the web interface may be unable to be associated with the authenticated certificate. In this case, the VSP control infrastructure 104 may authenticate the second user device 102 as a user device that is using an interface that is not associated with the authenticated certificate, and may determine that the short-term credential is to be transmitted to the second user device 102.

In this way, the VSP control infrastructure 104 may provide different credentials to differently authenticated user devices 102 that use different user interfaces to access the VPN environment. In some aspects, the VSP control infrastructure 104 may provide the long-term credential to a user device 102 that uses an interface associated with the authenticated certificate, and may provide the short-term credential to a user device 102 that uses an interface not associated with the authenticated certificate. The long-term credential may provide increased access to the VPN environment as compared to the short-term credential. For instance, the long-term credential may allow the first user device 102 to, for example, establish a secure tunnel with a VPN server 120 associated with the VPN environment and to transmit data requests to the VPN server 120 to receive data of interest. The short-term credential may allow the second user device 102 to perform administrative tasks without being able to establish the secure tunnel with the VPN server 120. The administrative tasks may include, for example, determining available VPN services and associated costs, editing information (e.g., address, password, etc.) associated with the second user device 102, or the like. Further, the long-term credential may allow the first user device 102 to have access to and/or remain connected to the VPN environment for a first duration of time (e.g., one month) and the short-term credential may allow the second user device 102 to have access to and/or remain connected to the VPN environment for a second duration of time (e.g., two hours), the first duration of time being longer than the second duration of time. Moreover, at an expiration of the first duration of time, the VSP control infrastructure 104 may enable the first user device 102 to renew the long-term credential for a finite number of times (e.g., five times for a total period of six months). In some aspects, the VSP control infrastructure 104 may enable the second user device 102 to exchange the short-term credential for the long-term credential when the second user device 102 uses the VPN application interface associated with the authenticated certificate to receive access to the VPN environment. In this case, the VSP control infrastructure 104 may receive relevant information (e.g., payment information, identity information, etc.) from the second user device and may transmit the authenticated certificate and/or information associated with the authenticated certificate to the second user device 102. The second user device 102 may use the information associated with the authenticated certificate to obtain the authenticated certificate, and use the VPN application interface associated with the authenticated certificate to access the VPN environment. The VSP control infrastructure 104 may transmit the long-term credential to the second user device 102 based at least in part on determining that the second user device 102 is using the VPN application interface that is associated with the authenticated certificate.

As shown by reference numeral 230, the VSP control infrastructure 104 may transmit credentials to the user devices 102 based at least in part on determining the interfaces used by the user devices 102. When the VSP control infrastructure 104 determines that the first user device 102 is using the VPN application interface that is associated with the authenticated certificate, the VSP control infrastructure 104 may transmit the long-term credential (e.g., first credential) to the first user device 102. Alternatively, when the VSP control infrastructure 104 determines that the first user device 102 is using the VPN application interface that is not associated with the authenticated certificate, the VSP control infrastructure 104 may transmit the short-term credential (e.g., second credential) to the first user device 102. With respect to the second user device 102, the VSP control infrastructure 104 may determine that the second user device 102 is using the web interface that is not associated with the authenticated certificate, and may transmit the short-term credential (e.g., second credential) to the second user device 102.

As shown by reference numeral 240, the user devices 102 may access the VPN environment based at least in part on the received credentials.

In some aspects, performing the authentication may include performing authentications for known user devices (e.g., user device 102) and for unknown user devices (e.g., user device 102), and based at least in part on results of the authentications, the VSP control infrastructure 104 may provide the long-term credential or the short-term credential. For instance, when a known user device 102 uses the web interface or the VPN application interface, the VSP control infrastructure 104 may verify an identity associated with the known user device 102. In an example, the VSP control infrastructure 104 may verify the identity by utilizing an open standard authorization protocol. In this case, the VSP control infrastructure 104 may accept information from a third-party (e.g., Google, Facebook, etc.) indicating that an actual entity is associated with the known user device 102. In another example, the VSP control infrastructure 104 may enable the known user device 102 to verify the identity via a confirmation mechanism (e.g., email, phone number, etc.). In this case, the VSP control infrastructure 104 may provide a code and/or a token via, for example, an email address associated with the known user device 102 and allow the known user device 102 to verify the identity by providing the code and/or the token to the VSP control infrastructure 104. Based at least in part on the identity being verified, the VSP control infrastructure may provide the short-term credential to the known user device 102.

When the known user device 102 wishes to obtain the increased access to the VPN environment, the VSP control infrastructure 104 may enable the known user device 102 to exchange the short-term credential for the long-term credential. In an example, when the known user device 102 is associated with a first type of operating system (e.g., iOS, Android, or the like), the VSP control infrastructure 104 may transmit a firebase cloud messaging (FCM) message to the known user device 102 with information associated with exchanging the short-term credential for the long-term credential. In some aspects, information included in the FCM message may include information to be provided by the known user device 102 via the VPN application interface to the VSP control infrastructure. Based at least in part on receiving the information included in the FCM message, the VSP control infrastructure 104 may provide the long-term credential to the known user device 102 to be used via the VPN application interface. In some aspects, the VSP control infrastructure 104 may provide the long-term credential in the FCM message. In another example, when the known user device 102 is associated with a second type of operating system (e.g., Windows), the VSP control infrastructure 104 may transmit a specific message (e.g., magic uniform resource locator (URL) link) to the known user device 102. Information included in the specific message may enable the known user 102 to exchange the short-term credential for the long-term credential.

When an unknown user device 102 uses the web interface, the VSP control infrastructure 104 may verify an identity associated with the unknown user device 102. In an example, the VSP control infrastructure 104 may enable the unknown user device 102 to verify the identity via a confirmation mechanism (e.g., email, phone number, etc.). In this case, the VSP control infrastructure 104 may provide a code and/or a token via, for example, an email address associated with the unknown user device 102 and allow the unknown user device 102 to verify the identity by providing the code and/or the token to the VSP control infrastructure 104. Based at least in part on the identity being verified, the VSP control infrastructure may provide the short-term credential to the unknown user device 102.

When the unknown user device 102 wishes to obtain the increased access to the VPN environment, the VSP control infrastructure 104 may enable the unknown user device 102 to exchange the short-term credential for the long-term credential. In an example, as discussed above, the VSP control infrastructure 104 may transmit a firebase cloud messaging (FCM) message to the unknown user device 102 and information included in the FCM message may provide the long-term credential to be used via the VPN application interface. In another example, as discussed above, the VSP control infrastructure 104 may transmit a specific message and information included in the specific message may enable the unknown user device 102 to exchange the short-term credential for the long-term credential.

In some aspects, when a user device 102 creates a new account and provides payment information (e.g., credit card number, bank account number, payment (e.g., PayPal) account number, etc.), the VSP control infrastructure 104 may provide the user device with the long-term credential to use via the VPN application interface.

By utilizing the above systems and techniques associated with providing an optimized authentication mechanism in a VPN, the VSP control infrastructure may mitigate having to maintain a plurality of APIs and to manage a plurality of authentication processes, thereby enabling efficient utilization of resources associated with the VSP control infrastructure (e.g., management resources, processing resources, consumed power, network bandwidth, storage resources, etc.) for more suitable tasks associated with the VPN. Further, the VSP control infrastructure may mitigate instances of private data associated with the user device becoming compromised and/or instances of damage to the user device. Additionally, the above systems and techniques allow tracking and preventing abusive access to the VPN environment via creation of free accounts. The above systems and techniques ensure that user devices can be logged off access to the VPN environment via the application interface upon device or credential loss.

As indicated above, FIG. 2 is provided as an example. Other examples may differ from what is described with regard to FIG. 2.

FIG. 3 is an illustration of an example process 300 associated with providing an optimized authentication mechanism in a VPN, according to various aspects of the present disclosure. In some aspects, the process 300 may be performed by a processor/controller (e.g., processing unit 110 and/or processor 520) associated with a VSP control infrastructure (e.g., VSP control infrastructure 104). As shown by reference numeral 310, process 300 includes receiving, at a processor, credential requests for accessing the VPN environment from a first user device using a first interface and from a second user device using a second interface. For instance, the VSP control infrastructure may utilize an associated communication interface (e.g., communication interface 570) along with the associated processor/controller to receive credential requests for accessing the VPN environment from a first user device using a first interface and from a second user device using a second interface, as discussed elsewhere herein.

As shown by reference numeral 320, process 300 includes transmitting, to the first user device, a first credential based at least in part on the first user device using the first interface. For instance, the VSP control infrastructure may utilize the communication interface and the associated processor/controller to transmit, to the first user device, a first credential based at least in part on the first user device using the first interface, as discussed elsewhere herein.

As shown by reference numeral 330, process 300 includes transmitting, to the second user device, a second credential based at least in part on the second user device using the second interface, the first credential being different from the second credential. For instance, the VSP control infrastructure may utilize the communication interface and the associated processor/controller to transmit, to the second user device, a second credential based at least in part on the second user device using the second interface, the first credential being different from the second credential, as discussed elsewhere herein.

Process 300 may include additional aspects, such as any single aspect or any combination of aspects described below and/or in connection with one or more other processes described elsewhere herein.

In a first aspect, process 300 includes determining that the first user device is using the first interface and that the second user device is using the second interface.

In a second aspect, alone or in combination with the first aspect, process 300 includes transmitting the second credential to the first user device in exchange for the first credential based at least in part on determining that the first user device is now using the second interface and is associated with an authenticated certificate.

In a third aspect, alone or in combination with the first through second aspects, in process 300, the first credential providing access for a first duration of time and the second credential providing access for a second duration of time, the first duration of time being longer than the second duration of time.

In a fourth aspect, alone or in combination with the first through third aspects, in process 300, the first credential providing access for performing a first set of operations and the second credential providing access for performing a second set of operations, the first set of operations being different than the second set of operations.

In a fifth aspect, alone or in combination with the first through fourth aspects, in process 300, the first interface includes a VPN application interface associated with the VPN environment and the second interface includes a web interface.

In a sixth aspect, alone or in combination with the first through fifth aspects, in process 300, transmitting the first credential includes transmitting the first credential based at least in part on determining that the first interface is associated with an authenticated certificate.

Although FIG. 3 shows example blocks of the process, in some aspects, the process may include additional blocks, fewer blocks, different blocks, or differently arranged blocks than those depicted in FIG. 3. Additionally, or alternatively, two or more of the blocks of the process may be performed in parallel.

As indicated above, FIG. 3 is provided as an example. Other examples may differ from what is described with regard to FIG. 3.

FIG. 4 is an illustration of an example process 400 associated with providing an optimized authentication mechanism in a VPN, according to various aspects of the present disclosure. In some aspects, the process 300 may be performed by a processor/controller (e.g., processing unit 110 and/or processor 520) associated with a VSP control infrastructure (e.g., VSP control infrastructure 104) and a processor/controller (e.g., processing unit 110 and/or processor 520) associated with a user device (e.g., user device 102). As shown by reference numeral 410, process 400 includes receiving, at a processor from a user device, a credential request for accessing the VPN environment. For instance, the VSP control infrastructure may utilize the associated memory and processor to receive, from a user device, a credential request for accessing the VPN environment, as discussed elsewhere herein.

As shown by reference numeral 420, process 400 includes transmitting, by the processor to the user device, a short-term credential based at least in part on determining that the user device is not associated with an authenticated certificate. For instance, the VSP control infrastructure may utilize the associated memory and processor to transmit, to the user device, a short-term credential based at least in part on determining that the user device is not associated with an authenticated certificate, as discussed elsewhere herein.

As shown by reference numeral 430, process 400 includes transmitting, by the processor to the user device, information associated with the authenticated certificate to enable the user device to exchange the short-term credential for a long-term credential. For instance, the VSP control infrastructure may utilize the associated memory/processor and an associated communication interface (e.g., communication interface 570) to transmit, by the processor to the user device, information associated with the authenticated certificate to enable the user device to exchange the short-term credential for a long-term credential, as discussed elsewhere herein.

As shown by reference numeral 440, process 400 includes transmitting, by the processor to the user device, the long-term credential based at least in part on determining that the user device is associated with the authenticated certificate. For instance, the VSP control infrastructure may utilize the associated memory/processor and the associated communication interface to transmit, to the user device, the long-term credential based at least in part on determining that the user device is associated with the authenticated certificate, as discussed elsewhere herein.

Process 400 may include additional aspects, such as any single aspect or any combination of aspects described below and/or in connection with one or more other processes described elsewhere herein.

In a first aspect, in process 400, receiving the credential request includes receiving the credential request via a web interface or a VPN application interface associated with the VPN environment.

In a second aspect, alone or in combination with the first aspect, in process 400, the short-term credential provides access for a first duration of time and the long-term credential provides access for a second duration of time, the first duration of time being shorter than the second duration of time.

In a third aspect, alone or in combination with the first through second aspects, in process 400, the short-term credential provides access for performing a first set of operations and the long-term credential provides access for performing a second set of operations, the first set of operations being different than the second set of operations.

In a fourth aspect, alone or in combination with the first through third aspects, process 400 includes determining that the user device is not associated with the authenticated certificate based at least in part on determining that the user device is using a web interface.

In a fifth aspect, alone or in combination with the first through fourth aspects, process 400 includes determining that the user device is associated with the authenticated certificate based at least in part on determining that the user device is using a VPN application interface.

In a sixth aspect, alone or in combination with the first through fifth aspects, process 400 includes transmitting, by the processor to the user device, information associated with renewing the long-term credential.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of example devices 500, according to various aspects of the present disclosure. In some aspects, the example devices 500 may form part of or implement the systems, environments, infrastructures, components, or the like described elsewhere herein (e.g., FIG. 1 and/or FIG. 2) and may be used to perform the example processes described elsewhere herein. The example devices 500 may include a universal bus 510 communicatively coupling a processor 520, a memory 530, a storage component 540, an input component 550, an output component 560, and a communication interface 570.

Bus 510 may include a component that permits communication among multiple components of a device 500. Processor 520 may be implemented in hardware, firmware, and/or a combination of hardware and software. Processor 520 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 520 may include one or more processors capable of being programmed to perform a function. Memory 530 may include a random access memory (RAM), a read only memory (ROM), and/or another type of dynamic or static storage device (e.g., a flash memory, a magnetic memory, and/or an optical memory) that stores information and/or instructions for use by processor 520.

Storage component 540 may store information and/or software related to the operation and use of a device 500. For example, storage component 540 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 550 may include a component that permits a device 500 to receive information, such as via user input (e.g., a touch screen display, a keyboard, a keypad, a mouse, a button, a switch, and/or a microphone). Additionally, or alternatively, input component 550 may include a component for determining location (e.g., a global positioning system (GPS) component) and/or a sensor (e.g., an accelerometer, a gyroscope, an actuator, another type of positional or environmental sensor, and/or the like). Output component 560 may include a component that provides output information from device 500 (via, for example, a display, a speaker, a haptic feedback component, an audio or visual indicator, and/or the like).

Communication interface 570 may include a transceiver-like component (e.g., a transceiver, a separate receiver, a separate transmitter, and/or the like) that enables a device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, and/or the like.

A device 500 may perform one or more processes described elsewhere herein. A device 500 may perform these processes based on processor 520 executing software instructions stored by a non-transitory computer-readable medium, such as memory 530 and/or storage component 540. As used herein, the term "computer-readable medium" may refer to a non-transitory memory device. A memory device may include memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 5 are provided as an example. In practice, a device 500 may include additional components, fewer components, different components, or differently arranged components than those shown in FIG. 5. Additionally, or alternatively, a set of components (e.g., one or more components) of a device 500 may perform one or more functions described as being performed by another set of components of a device 500.

As indicated above, FIG. 5 is provided as an example. Other examples may differ from what is described with regard to FIG. 5.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method in a virtual private network (VPN) environment, the method comprising:
   receiving, at a processor, credential requests for accessing the VPN environment from a first user device using a first interface and from a second user device using a second interface;
   transmitting, to the first user device, a long-term credential based at least in part on the first user device using the first interface;
   transmitting, to the second user device, a short-term credential based at least in part on the second user device using the second interface, the long-term credential being different from the short-term credential; and
   transmitting, to the second user device, a message including exchange information to enable the second user device to exchange the short-term credential for the long-term credential.

2. The method of claim 1, further comprising:
   transmitting the long-term credential to the second user device in exchange for the short-term credential based at least in part on determining that the second user device is now using the first interface and is associated with an authenticated certificate.

3. The method of claim 1, wherein the long-term credential provides access for a first duration of time and the short-term credential provides access for a second duration of time, the first duration of time being longer than the second duration of time.

4. The method of claim 1, wherein the long-term credential provides access for performing a first set of operations and the short-term credential provides access for performing a second set of operations, the first set of operations being different than the second set of operations.

5. The method of claim 1, wherein the first interface includes a VPN application interface associated with the VPN environment and the second interface includes a web interface.

6. The method of claim 1, wherein transmitting the long-term credential includes transmitting the long-term credential based at least in part on determining that the first interface is associated with an authenticated certificate.

7. A device associated with a virtual private network (VPN) service environment, the device comprising:
   a memory; and
   a processor communicatively coupled to the memory, the memory and the processor being configured to:
      receive credential requests for accessing the VPN environment from a first user device using a first interface and from a second user device using a second interface;
      transmit, to the first user device, a long-term credential based at least in part on the first user device using the first interface;
      transmit, to the second user device, a short-term credential based at least in part on the second user device using the second interface, the long-term credential being different from the short-term credential; and
      transmit, to the second user device, a message including exchange information to enable the second user device to exchange the short-term credential for the long-term credential.

8. The device of claim 7, wherein the memory and the processor are configured to transmit the long-term credential to the second user device in exchange for the short-term credential based at least in part on determining that the second user device is now using the first interface and is associated with an authenticated certificate.

9. The device of claim 7, wherein the long-term credential provides access for a first duration of time and the short-term credential provides access for a second duration of time, the first duration of time being longer than the second duration of time.

10. The device of claim 7, wherein the long-term credential provides access for performing a first set of operations and the short-term credential provides access for performing a second set of operations, the first set of operations being different than the second set of operations.

11. The device of claim 7, wherein the first interface includes a VPN application interface associated with the VPN environment and the second interface includes a web interface.

12. The device of claim 7, wherein, to transmit the long-term credential, the memory and the processor are configured to transmit the long-term credential based at least in part on determining that the first interface is associated with an authenticated certificate.

13. A non-transitory computer-readable medium configured to store instructions, which when executed by a processor, configure the processor to:
- receive credential requests for accessing the VPN environment from a first user device using a first interface and from a second user device using a second interface;
- transmit, to the first user device, a long-term credential based at least in part on the first user device using the first interface;
- transmit, to the second user device, a short-term credential based at least in part on the second user device using the second interface, the long-term credential being different from the short-term credential; and
- transmit, to the second user device, a message including exchange information to enable the second user device to exchange the short-term credential for the long-term credential.

14. The non-transitory computer-readable medium of claim 13, wherein the processor is configured to transmit the long-term credential to the second user device in exchange for the short-term credential based at least in part on determining that the second user device is now using the first interface and is associated with an authenticated certificate.

15. The non-transitory computer-readable medium of claim 13, wherein the long-term credential provides access for a first duration of time and the short-term credential provides access for a second duration of time, the first duration of time being longer than the second duration of time.

16. The non-transitory computer-readable medium of claim 13, wherein the long-term credential provides access for performing a first set of operations and the short-term credential provides access for performing a second set of operations, the first set of operations being different than the second set of operations.

17. The non-transitory computer-readable medium of claim 13, wherein the first interface includes a VPN application interface associated with the VPN environment and the second interface includes a web interface.

* * * * *